July 25, 1967

K. J. STOKES 3,333,157

PLUG-IN TYPE CONTROL DEVICE PANEL ASSEMBLY
WITH ANGULARLY CONTRASTING
CONTACT PORTIONS

Filed July 30, 1965

INVENTOR.
KENNETH J. STOKES
BY
Robert T. Casey
ATTORNEY

July 25, 1967 K. J. STOKES 3,333,157
PLUG-IN TYPE CONTROL DEVICE PANEL ASSEMBLY
WITH ANGULARLY CONTRASTING
CONTACT PORTIONS
Filed July 30, 1965 2 Sheets-Sheet 2
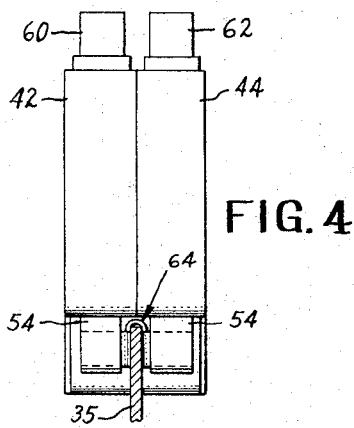
FIG. 4
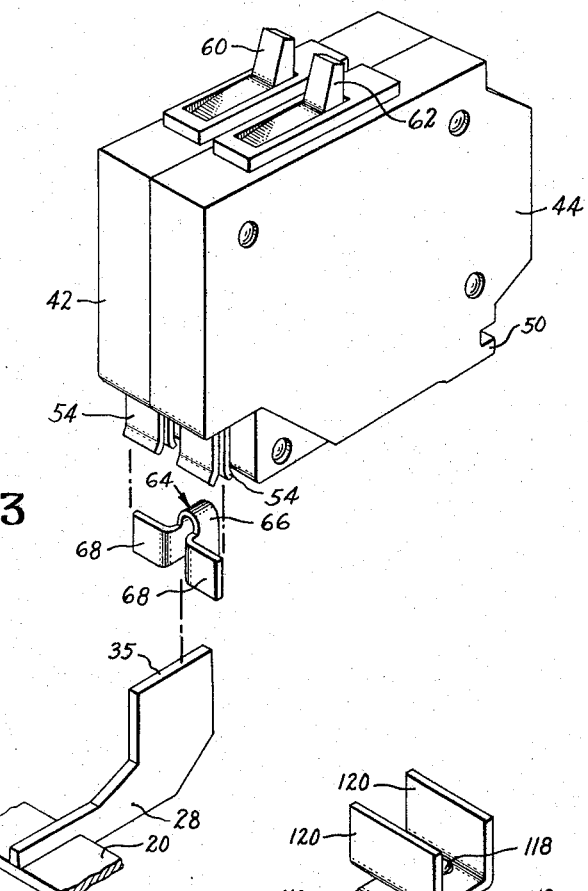
FIG. 3
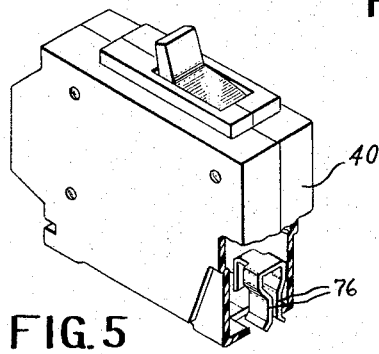
FIG. 5
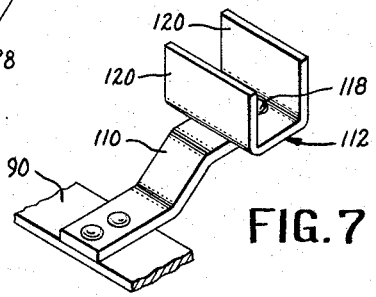
FIG. 7
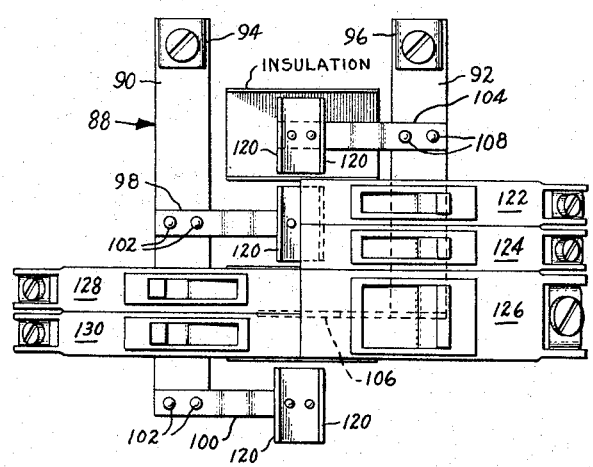
FIG. 6
FIG. 8
INVENTOR.
KENNETH J. STOKES
BY Robert H. Casey
ATTORNEY

United States Patent Office

3,333,157
Patented July 25, 1967

3,333,157
PLUG-IN TYPE CONTROL DEVICE PANEL ASSEMBLY WITH ANGULARLY CONTRASTING CONTACT PORTIONS
Kenneth J. Stokes, Wethersfield, Conn., assignor to General Electric Company, a corporation of New York
Filed July 30, 1965, Ser. No. 476,015
3 Claims. (Cl. 317—119)

ABSTRACT OF THE DISCLOSURE

A plug-in type control device panel assembly includes busbars having upstanding blade type stationary contacts with their major flat surfaces perpendicular to the busbars for receiving a first type of plug-in control device. Contact adapter elements are selectively mounted on some of the blades to provide sidewise-extending "wings" with major flat surfaces parallel to the busbars to receive a second type of plug-in control device.

---

This invention relates to control device panel boards and centers and the like for use in electric lighting and power distribution systems, and more particularly to contact members for receiving electrically connecting plug-in type control devices or circuit breakers to the busbars of panel boards or load centers.

As set forth in detail in the copending application of Keith W. Klein, Ser. No. 420,875 filed Dec. 24, 1964, circuit breakers or control devices are conventionally made in a broad variety of ampere ratings and different modular sizes or widths. Heretofore, the most prevalent construction for such breakers or control devices has utilized a contact socket extending longitudinally of its housing with jaws which would seat snugly against the opposite surfaces of a contact arm on a busbar of the panel board. Generally, such contact arms have been fabricated so as to provide a blade portion of relatively thin cross section adjacent the free or unmounted end upon which could be received the sockets of two oppositely extending circuit breakers or control devices.

In the aforementioned application of Keith W. Klein, there is disclosed a novel construction for a panel board or load center wherein at least some of the contact members have socket-receiving portions projecting normally to the plane of the major transverse dimension of the contact arm and parallel to the busbars. These socket-receiving portions each provide a pair of contact surfaces and receive sockets which extend transversely of the housing of the circuit breaker or control device. In this manner, two or more types of contact members may be prearranged to segregate desired portions of the load center so that only devices of particular modular sizes may be received, thus avoiding mistakes in assembly and substitution. In the specific embodiment shown therein, the contact has a blade portion with the plane of its major transverse dimension extending normally to the support and to the busbars, and a plurality of pins project outwardly from the blade portion to provide the socket-receiving portions which extend parallel to the busbars.

In the copending application of Lewis W. Jacobs and Robert Sabatella, Ser. No. 420,868, filed Dec. 24, 1964, there is disclosed another form of contact member wherein the free end portion of the contact arm is configured to provide a base portion with the plane of its major transverse dimension extending in spaced relationship and generally parallel to the support and with generally planar wing portions projecting normally upwardly therefrom and extending generally parallel to the busbars. The contact arm may also have a blade portion projecting upwardly from the contact arm base portion intermediate the width thereof and extending normally to the busbars. Thus, control devices having transversely-extending sockets may be received on the wing portions, and a control device of the type having a longitudinally-extending socket may be received upon the control blade portion where such is provided.

Thus, the inventions of the aforementioned applications provide great versatility in segregating portions of the load center and in permitting wide adaptability to mounting of a multiplicity of control devices on a single contact member. As specifically disclosed therein, the contact members have been specially fabricated so as to require substitution thereof in existing load centers or panel boards which predominately employ a contact member of the type providing a contact arm which is blade-like in configuration and has the plane of its major transverse dimension generally normal to the support and to the busbars.

It is an object of the present invention to adapt contact members of the type having a blade-like contact arm with the plane of the major transverse dimension extending normally to the support and busbars so as to receive control devices of the type having sockets which extend transversely thereof.

It is also an object to provide a panel board having such adapted contact members which will accept both control devices of the type having transversely-extending sockets and control devices of the type having longitudinally-extending sockets.

Another object is to provide a panel board wherein the location of the control devices of the type having transversely-extending sockets may be quickly established or altered as the occasion may arise by use of removable adapter members.

Other related objects and advantages will be readily apparent from the following detailed specification and appended claims.

It has now been found that the foregoing and related objects and advantages may be readily attained in a novel control device panel board having a support and an elongated busbar supported in insulated relationship on the support. An electrical contact unit has a contact arm portion electrically connected adjacent one end to the busbar and extends generally normally thereto, and the contact arm portion has adjacent its other end a blade portion with a major transverse dimension and a minor transverse dimension with the plane of its major dimension extending normally to the support and to the busbar. A contact clip has a mounting portion engaged with the blade portion and a generally planar wing portion projecting therefrom to one side of said blade portion. The wing portion extends generally parallel to the busbar and generally normally to the major plane of the blade portion and is adapted to receive a socket extending transversely of a circuit breaker to provide electrical contact therefor to the busbar, the opposite surfaces of the wing portion providing a pair of contact surfaces extending generally parallel to the busbar and to the major plane.

The present invention enables the simultaneous use of the blade portion which is of relatively thin section to receive a circuit breaker of the device having a socket extending longitudinally thereof since it provides an adapter which may be mounted adjacent one end of the blade portion, thus permitting use of the remaining portion of the blade portion to receive such a breaker. In accordance with most desirable practice for maximum utilization of a single contact member, the contact element has a pair of wing portions projecting to opposite sides of the blade portion so that each may receive a control device. If so desired, two such contact elements may be mounted on the blade portion in spaced relationship, thus providing four wing portions to seat four circuit breakers with two extending in each direction and being disposed over one of an adjacent pair of busbars.

To facilitate engagement and disengagement, the contact element has a generally U-shaped mounting portion so that the base thereof overlies the edge of the blade portion spaced from the support and the legs thereof are resiliently deflectable so as to bear against the opposite sides or surfaces of the blade portion, thus providing a spring or friction fit. From the standpoint of economy and good electrical properties, the element is integrally formed and has the wing portions bent at an angle of 90° from the plane of the legs of the mounting portion.

The panel boards of conventional construction generally have two or more parallel busbars that are connected to a support, and a plurality of generally parallel contact arms are connected to each of the busbars for receiving plug-in type circuit breakers. The panel board has retaining means on both sides of the support for securing the circuit breakers thereon in positions overlying the busbars. Generally oppositely extending control devices are mounted on a single busbar to obtain highly efficient utilization thereof.

The circuit breakers for use on a particular control panel are of the same general dimensions except that the width desirably varies for different capacity devices as set forth in the aforementioned Klein application. The length of the circuit breakers are generally one half the width of the control panel so that two circuit breakers may be attached to opposite sides of the control panel and be connected to the same contact arm. The contact arms are normally spaced at intervals along the length of the busbar so as to provide a staggered relationship with contact arms extending from an adjacent busbar.

It will be readily appreciated that the present invention also contemplates that adjacent electrical contact arms may be connected to different sources of electrical energy. Typically in such an arrangement adjacent electrical contact arms may be arranged to supply two different phases of electrical energy so that the wing portions of two such adjacent contact arms are disposed to be engageable by two circuit breakers of relatively small modular size joined in assembly by appropriate means including a common handle to provide a two-pole circuit breaker assembly.

In a similar manner, the present invention may provide thin adjacent pairs of contact surfaces which are adaptable to connect with three different phases of an electrical source. A circuit breaker of large modular size may be joined by appropriate means including a common handle tie to be engageable with a blade portion and two adjacent wing portions on either side as a three-pole circuit breaker assembly.

Thus, the present invention is ideally adapted to a system wherein the larger capacity circuit breakers are of relatively large width and have longitudinally-extending sockets and the smaller capacity breakers are of smaller width and have transversely-extending sockets. This modular system may be readily adapted into a conventional panel board having spaced, parallel contact blades which would heretofore accept only devices of the type having longitudinally sockets. Various combinations of such modular sizes may be effected and, if so desired, the panel board may be constructed with different types of contact members so that the present invention may be used to adapt only certain contact members therein to avoid excessive loading of a single contact member or loss of segregation in the circuit breakers at various portions thereof.

The term "circuit breakers" as used herein refers to any control device which is capable of making and/or breaking an electric circuit including circuit breakers which are manually operable and also those which have fusible means.

For a more complete understanding of the present invention, reference should now be made to the following detailed specification and the accompanying drawings wherein:

FIGURE 3 is an exploded view of a subassembly comprised of two circuit breakers having transverse sockets, a contact element, and a contact arm attached to a fragmentarily illustrated busbar;

FIGURE 4 is a front elevational view of the subassembly shown in FIGURE 3 with the contact element inserted in place and engaged with the contact arm which is fragmentarily illustrated and shown in cross section;

FIGURE 5 is a fragmentary perspective view of the circuit breaker having a longitudinally-extending socket with portions of the housing broken away to expose the socket;

FIGURE 6 is a plan view of a control device panel board illustrating a contact unit embodying the present invention in combination with another type of contact unit designed to receive only circuit breakers having transversely-extending sockets;

FIGURE 7 is a fragmentary perspective view of a busbar and the other type of contact unit illustrated in FIGURE 6, and FIGURE 8 is a fragmentary plan view, showing a contact unit comprising a contact blade and two contact elements in accordance with the invention.

Figure 1:
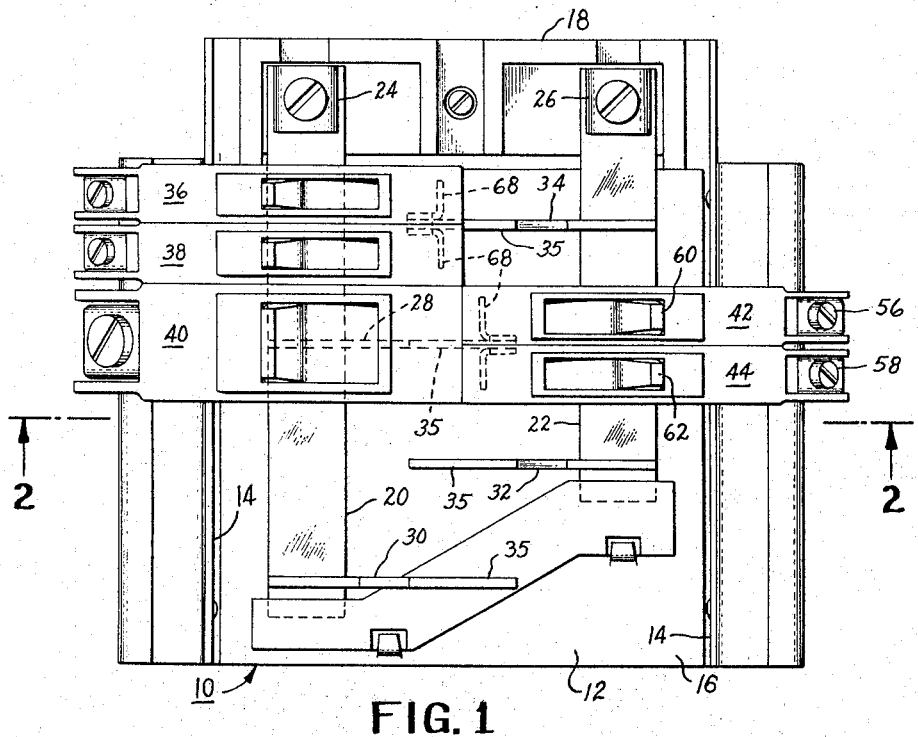
FIGURE 1 is a plan view of a control device panel board of the present invention with circuit breakers in engagement with contact members on the panel board in part shown in dotted line.
Figure 2:
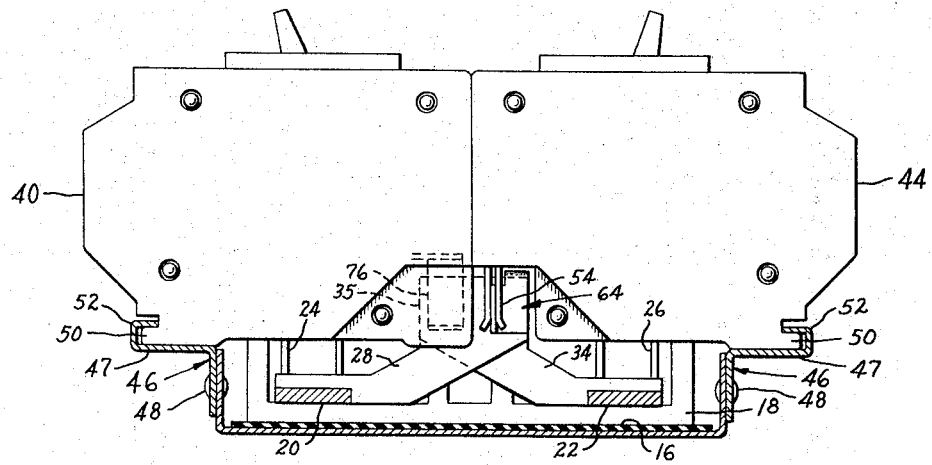
FIGURE 2 is a cross-sectional view of the control device panel board of FIGURE 1 along the line 2—2 of FIGURE 1 with the longitudinally-extending socket of one of the circuit breakers and parts of the contact means shown in dotted line.

Referring first to FIGURES 1 and 2, therein illustrated is an electrical control panel board assembly which has a housing or support in the form of a channel-shaped member generally designated by the numeral 10 and having a base portion 12 and side wall portions 14. A base plate 16 is attached to the support 10 and supports an insulation member 18 which in turn provides insulated support for the pair of parallel extending busbars 20 and 22 which are disposed adjacent opposite side wall portions 14 of the support 10 with line terminals 24 and 26 on one end thereof. Two contact arms 28 and 30 are electrically connected adjacent one end to the busbar 20 and are supported on the insulation member 18. Similarly, at the opposite side of support 10, two additional contact arms 32 and 34 are electrically connected adjacent one end to the busbar 22 and are supported on the insulation member 18.

As can be seen, the contact arms 28, 30, 32 and 34 extend normally to the busbars 20, 22 and provide blade portions 35 adjacent the free end thereof spaced above the support 10 and aligned in a row. The blade portions 35 are of thin cross section to have a major transverse dimension and a minor transverse dimension with the plane of the major dimension extending generally normally to the support 10 and to the busbars 20, 22. Generally, such contact arm configuration is similar to that heretofore widely employed with circuit breakers of the type having sockets extending longitudinally of the housing thereof.

Mounted on the contact arms 28, 34 are five circuit breakers 36, 38, 40, 42 and 44 which are similarly constructed except that the breaker 40 has a width approximately twice that of the other breakers, i.e., it is of a larger modular size. The circuit breakers are retained on the support 10 by the flanges generally designated by the numeral 46 which have an L-shaped mounting portion 47 secured to the sidewall portions 14 by rivets 48 or other suitable means and a channel-shaped locking portion 52 which engages a lug portion 50 on the outer end of the insulating housing of the circuit breakers.

As best seen in FIGURES 3 and 4, the circuit breakers 42 and 44 (and similarly the breakers 36 and 38) each have a contact socket provided by a pair of opposed resiliently deflectable jaws 54 of electrically conductive material which are electrically connected to a load terminal 56 (shown in FIGURE 1) by a circuit (not shown) in the housing that may be opened or closed by operating switch handles 60 and 62. As can be seen, the socket and its jaws 54 extend transversely of the circuit breaker housing adjacent the intersection of the bottom and end wall thereof.

The jaws 54 of the contact sockets resiliently bear on the opposite surfaces of the planar wing portions 68 of a contact element generally designated by the numeral 64. The contact element 64 has a central mounting portion 66 of generally U-shaped configuration with the legs thereof bearing against the opposite surfaces or sides of the blade portion 35 of the contact arm 28, thus providing firm but disengageable placement thereon. In this manner, the circuit breakers 36, 38, 42 and 44 with their transversely extending sockets are readily mounted upon the blade portion 35 of the contact arms 28 and 34.

In assembling the breakers 36, 38, 42 and 44 to the support 10, the contact elements 64 are first inserted into the resilient jaws 54 of the sockets thereof, and the lug portions 50 of the circuit breaker housings are then inserted into the channel-shaped locking portion 52 of the flanges 46. The circuit breakers are then rotated downwardly to press the central mounting portions 66 of the contact elements 64 onto the blade portions 35 of the contact arms.

The larger circuit breaker 40, as best seen in FIGURE 5, is constructed in a manner similar to the smaller circuit breakers described above except that it has a contact socket provided by a pair of resiliently deflectable jaws 76 extending longitudinally of the circuit breaker housing so that the resilient jaws 76 may directly engage the opposite sides or surfaces of the blade portion 35 of the contact arm 28. The thickness of contact arm 28 is greater than the gap between resilient jaws 76 on circuit breaker 40 so that the circuit breaker is thereby held firmly in place.

Thus, it can be seen that the contact arm 28 can receive the large module breaker 40 with its longitudinally extending socket and two smaller module breakers 42, 44 with transversely extending sockets by use of the contact elements 64.

As shown in FIGURE 6, the present invention is adapted to use in panel board assemblies having a number of contact arms which will receive only control devices of the type having transversely extending sockets, thus limiting the type of breaker that may be mounted at a particular location. Therein illustrated is a control device control panel board generally designated by the numeral 88 which has busbars 90 and 92 which are supported on a support (not shown) similar to the support 10 of FIGURES 1 and 2. Line terminals 94 and 96 are attached to the end of busbars 90 and 92 for connection to a power source. Contact arms 98 and 100 are spaced apart and each electrically connected adjacent one end to the busbar 90 by means of rivets 102, and contact arms 104 and 106 are spaced apart and each electrically connected adjacent one end to the busbar 92 by means of rivets 108.

The contact arms 98, 100 and 104 are best seen in FIGURE 7 and have generally flat arm portions 110 and channel-shaped contact elements generally designated by the numeral 112 attached to the free end thereof by rivets 118 or the like. As can be seen, the free end portions of the arm portions 110 have a major transverse dimension and a minor transverse plane with the plane of the major transverse dimension extending in spaced relationship and generally parallel to the support (not shown). The legs 120 of the contact elements 112 provide a pair of spaced, generally planar wing portions extending normally to the major plane of the end portion and parallel to the busbars 90, 92 with the opposite sides thereof providing a pair of contact surfaces. Each of the wing portions 120 is adapted to receive a pair of circuit breakers 122, 124 with a contact socket extending transversely of the breaker housing as in the case of the breakers 36, 38, 42 and 44 in FIGURES 1-4.

The contact arm 106 is formed similarly to those of FIGURES 1-5 so as to receive a large module circuit breaker 126 which has a socket (not shown) extending longitudinally of the circuit breaker housing and similar to the breaker 40 of FIGURES 1-5. A pair of smaller module breakers 128, 130 having transversely extending sockets (not shown) similar to the breakers 122, 124 are also received on the contact arm 106 by use of a contact element (not shown) similar to the element 64 of FIGURES 1-4.

FIGURE 8 illustrates a form of the invention in which two contact elements 64 are mounted on the same contact blade 35, thereby providing facility for mounting four smaller module breakers thereon.

Thus, it can be seen that the present invention enables versatile adaptation of contact members of the type having a blade-type contact arm with the plane of the major transverse dimension extending normally to the support to permit them to receive both circuit breakers having longitudinally extending sockets and circuit breakers having transversely extending sockets. Since the contact members may be varied readily as to the type and/or arrangement of circuit breakers which they may receive, a wide and facile rearrangement of the panel board may be effected and may subsequently be altered. These contact members can be employed in combinaton with other types of contact members which will receive only one type of circuit breaker so as to limit the type of circuit breaker that may be included in the panel board at a given location.

While the invention has been illustrated in only one embodiment, it will be readily apparent that many modifications thereof may be made, and I therefore intend by the appended claims to cover all such modifications as fall within the true spirit and scope of the invention.

What I claim as new and desire to secure by Letters Patent of the United States is:

What I claim as new and desire to secure by Letters Patent of the United States is:

1. In a control device panel board, the combination comprising:
 (a) a support;
 (b) an elongated busbar supported in insulated relationship on said support;
 (c) a contact arm electrically connected adjacent one end thereof to said busbar and extending generally normally thereto, said contact arm having adjacent its other end a blade portion with a major transverse dimension and a minor transverse dimension, the plane of the major dimension extending generally normally to said support and to said busbar; and
 (d) a readily engageable contact element on said blade portion adjacent said other end, said element having a generally U-shaped central portion with resiliently deflectable legs engaging opposite sides of said blade portion, said element also having generally planar wing portions extending oppositely from said central portion and extending generally parallel to said busbar and normally to said blade portion major plane, the opposite surfaces of each of said planar wing portions providing a pair of contact surfaces extending generally parallel to said busbar and generally normally to said major plane, each of said wing portions being adapted to receive a contact socket extending transversely of an associated circuit breaker and said blade portion being adapted to receive a socket extending longitudinally of a circuit breaker to provide electrical contact therefor to said busbar.

2. The control device panel board of claim 1 wherein said contact element is integrally formed with the said wing portions being bent at an angle of about 90° to the legs of said central portion.

3. In a control device panel board, the combination comprising:
  (a) a support;
  (b) an elongated busbar supported in insulated relationship on said support;
  (c) a contact arm electrically connected adjacent one end thereof to said busbar and extending generally normally thereto, said contact arm having adjacent its other end a blade portion with a major transverse dimension and a minor transverse dimension, the plane of the major dimension extending generally normally to said support and to said busbar; and
  (d) a pair of readily engageable contact elements spaced apart on said blade portion adjacent said other end, each of said elements having a generally U-shaped central portion with resiliently deflectable legs engaging opposite sides of said blade portion, each of said elements also having generally planar wing portions extending oppositely from said central portion and extending generally parallel to said busbar and normally to said blade portion major plane, the opposite surfaces of each of said planar wing portions providing a pair of contact surfaces extending generally parallel to said busbar and generally normally to said major plane, each of said wing portions being adapted to receive a contact socket extending transversely of an associated circuit breaker to provide electrical contact therefor to said busbar.

References Cited

UNITED STATES PATENTS

| | | | |
|---|---|---|---|
| 3,054,025 | 9/1962 | Edmunds | 317—119 |
| 3,095,524 | 6/1963 | Leonard et al. | 317—119 |
| 3,200,228 | 8/1965 | Locher | 200—168 |

ROBERT K. SCHAEFER, *Primary Examiner.*

H. O. JONES, *Assistant Examiner.*